United States Patent [19]

Watanabe et al.

[11] 4,211,894
[45] Jul. 8, 1980

[54] TRANSMITTER MULTIPLEXING SYSTEM FOR A LAND MOBILE COMMUNICATION SYSTEM

[75] Inventors: Kunio Watanabe; Heiichi Yamamoto, both of Yokosuka, Japan

[73] Assignee: Nippon Telegraph and Telephone Public Corporation, Tokyo, Japan

[21] Appl. No.: 948,544

[22] Filed: Oct. 4, 1978

[30] Foreign Application Priority Data

Oct. 14, 1977 [JP] Japan ................................ 52-122469

[51] Int. Cl.² ............................................. H04Q 7/04
[52] U.S. Cl. .................................. 179/2 EB; 370/57;
455/33
[58] Field of Search ................ 179/2 E, 2 EB, 15 BZ,
179/15 FD; 343/176, 200, 204, 207, 208;
325/53, 55, 47, 61, 64

[56] References Cited

U.S. PATENT DOCUMENTS

| 3,806,838 | 4/1974 | Kitazume | 179/15 FD |
| 4,127,744 | 11/1978 | Yoshikawa et al. | 179/2 EB |
| 4,128,740 | 12/1978 | Graziano | 179/2 EB |

Primary Examiner—Bernard Konick
Assistant Examiner—Joseph A. Popek

Attorney, Agent, or Firm—Burgess, Ryan and Wayne

[57] ABSTRACT

A common transmitting antenna system for a base station in a land mobile communication system like a land mobile telephone system consists of an antenna system with a plurality of input terminals which are so arranged as to avoid mutual radio signal interference, a plurality of transmitter multiplexers comprising a plurality of bandpass filters and a junction box for combining outputs of the bandpass filters, the output terminal of which is connected to one of the input terminals of the antenna system, and a plurality of transmitter groups respectively connected to the output of the bandpass filters. The pass bandwidth of the bandpass filters in the transmitter multiplexers are so selected that when they are arranged in the order of their pass bandwidth, the entire land mobile communication system frequency bandwidth assigned to the base station transmission may be covered by these pass bands. The transmitter groups feature automatic frequency tuning of multiradio channel capable of transmitting entire radio channels in the pass bands of the band pass filters in the transmitter multiplexer. Thus, a land mobile communication system is provided wherein the transmission channels may be instantaneously switched.

10 Claims, 10 Drawing Figures

FIG. 2  AN EXAMPLE OF THE CONSTRUCTION OF RADIO ZONES

RADIO ZONE OF SAME FREQUENCY

ANTENNA SYSTEM WITH FOUR INDEPENDET INPUT TERMINALS VOID OF MUTUAL INTERFERENCE

TRANSMITTER MULTIPLEXING SYSTEM FOR A LAND MOBILE COMMUNICATION SYSTEM

BACKGROUND OF THE INVENTION

The present invention relates to a transmitter multiplexing system for a land mobile communication system wherein a plurality of transmitters capable of instantaneously switching their transmission channels may use a common antenna system in a base station of a land mobile communication system, for instance, a land mobile telephone system.

In the land mobile communication systems, various systems have been proposed and used in order to attain more efficient use of the assigned radio frequency band widths as will be described below.

i. Frequency Division

This system uses a Single Channel Per Carrier or SCPC system wherein each channel is assigned a frequency of a bandwidth and the bandwidth of the channel is reduced as practically as possible.

For instance, the assigned band in the 800 MHz region is divided into a base station transmission band (a mobile station reception band) and a base station reception band (a mobile station transmission band). The transmission and reception bands are further divided into a large number of communication channels with a narrow band (of for instance 25 KHz) (FIG. 1).

ii. Space Division

A wide service area is divided into a large number of small radio zones or cells, and the radio channels assigned to one radio zone or cell are resumed in another zone or cell spaced apart from the former by a distance which will not cause any interference between the radio channels in the two radio zone or cells. For instance, the radio zones are 5 to 10 kilometers in radius, and the forbidden region where the reuse of radio channels assigned to one radio zone is forbidden is 12 to 15 radio zones or cells (FIG. 2).

iii. Time Division

With this system a plurality of subscribers may use a single radio channel in a time division manner. This system may be further divided into two systems, one being the fixed-frequency system and the other dynamic frequency assignment system.

a. Fixed Radio Channel Assignment Method:

A plurality of fixed frequency channels are assigned to each of radio zones depending upon the traffic intensity therein and in such a blocking probability below a predetermined level, a mobile station is equipped with a transmitter-receiver capable of operating on any channels assigned to all of the radio zones.

The radio channels assigned to one of the radio zones in the fundamental block may be assigned to a radio zone outside of the fundamental block in such a way that no interference will occur between the two zones. Thus even when the service area is increased, it may be sufficiently covered with the assigned channels (FIG. 1). (Reference is made to Review of the Electrical Communication Laboratories, Vol. 25, No. 11-12, November-December, 1977, P. 1157-1171).

b. Dynamic Radio Channel Assignment Method

The base station in each radio zone is equipped with the simultaneous multi-channel transmission and reception capabilities on any of the assigned channels out of the whole channels. The channels are allotted depending upon the traffic intensity in the zone. Each of the mobile stations is equipped with the capability on a minimum number of channels to provide communication capability anywhere in the service area with a blocking probability less than a predetermined value. In practice, the mobile radio control stations determine the frequency used by a mobile station depending upon the frequencies used in the radio zone where the mobile station is traveling or is stationary and the adjacent zones. (Reference is made to IEEE Transaction on Commuication Technology, Vol. COM-18, No. 1, February, 1970, P. 12-21.)

In the prior art, the combination of the Single Channel Per Carrier System, the space division system with small radio zones or cells, the fixed frequency assignment system and the time division system wherein a mobile transmitter-receiver operates on a plurality of radio channels has been proposed and demonstrated. (An example of reference is made to Review of the Electrical Communication Laboratories, Vol. 25, No. 11-12, November-December, 1977.)

These prior art land mobile radio communication systems have some problems to be described below.

i. Because of the fixed frequency assignment to each radio zone, the division loss of the assigned frequency band results.

ii. Since the mobile stations must be capable of operating on any of all of the assigned channels, the mobile equipment becomes very expensive.

iii. When a mobile station crosses the border between the adjacent radio zones, it must switch from one radio channel to another so that the communication may be instantaneously interrupted; that is, noise is generated and the communication may be completely interrupted because of the failure in switching from one channel to another.

In order to overcome the above problems, the combination of the Single Channel Per Carrier System, the space division system and the dynamic channel assignment system has been proposed and demonstrated. The mobile radio control station which controls all of the zone stations determines, whenever a communication is initiated, the transmission and reception channels of a mobile station based on the radio channels used in a radio zone with which the mobile station wish to communicate and the radio channels used in the adjacent radio zones. When the mobile station which is communicating on the assigned channels crosses the borders of the adjacent radio zones, it is not needed to change the assigned channels because the base station in the next radio zone switches the transmission and reception frequencies to those assigned to the mobile station. Since all of the assigned channels may be used in each radio zone as described above, the division loss may be minimized. Furthermore, the frequency assignment may be carried out easily in response to the variation in traffic intensity which varies from time to time in each radio zone. Thus it is sufficient to provide a mobile station with a minimum channel switching capability so that the cost reduction of mobile stations may be attained. Moreover when the mobile station passes from one zone station into another, the next master station switches the transmission and reception channels to those used by the coming mobile station so that the instantaneous interruption of communication may be minimized and the interruption of communication due to the failure of channel switching may be substantially eliminated. (IEEE Spectrum, Vol. 8, No. 7, July, 1971, P. 28–36).

In order that each of the base stations may establish simultaneous communications on a plurality of channels out of all the assigned channels depending upon the traffic intensity in that zone, the multi-channel transmitters and receivers must be connected to an antenna system, the number of transmitters and receivers being dependent upon the traffic intensity. When each transmitter-receiver is connected to an independent antenna, the base station construction cost becomes prohibitively high.

Various common antenna system both for transmission and reception which are economically feasible have been studied and investigated, but so far there has been not proposed a common transmitting antenna system capable of instantaneous frequency or channel switching because of the common antenna loss and adverse non-linear characteristics.

SUMMARY OF THE INVENTION

Accordingly, one of the obJects of the present invention is to provide a transmitter multiplexing system for a land mobile communication system which may substantially eliminate the variation in transmission output even when the transmission frequency of a transmitter is instantaneously switched to another transmission frequency within the frequency ban assigned to the land mobile communication system, which may minimize the common loss and non-linear distortion and wherein one common antenna system may be used by a plurality of multi-channel transmitters.

Briefly stated, the present invention provides a transmitter multiplexing system for a land mobile communication system comprising an antenna system consisting of a plurality of antenna elements so arranged as to avoid mutual interference or consisting of an antenna surface and a plurality of primary radiators each with an independent input and so arranged as to avoid mutual interference or consisting of a plurality of antenna surfaces which are combined to form one antenna reflecting surface and to which are applied a plurality of inputs through hybrid coupling means so as to avoid mutual interference; a plurality of transmitter multiplexers connected through a feed line system to said common antenna system and comprising a plurality of band pass filters and a junction box for combining a plurality of inputs of the bandpass filters, the output terminal of which is connected to one of a plurality of input terminals of the antenna system.

Figure 1:
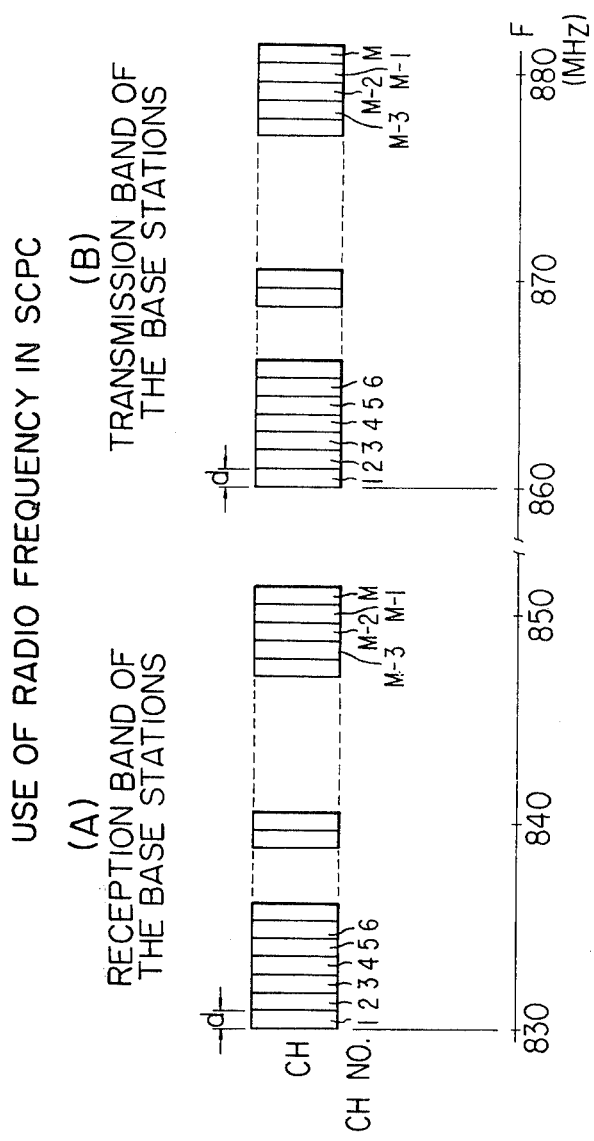
FIG. 1 shows the frequency assignment in the single channel per carrier system.

DESCRIPTION OF THE PREFERRED EMBODIMENTS:

FIG. 1 shows the 800 MHz band radio channels assigned to a land mobile communication system. The assigned band is divided into the transmission band B and the reception band A of the base stations (that is, the reception and transmission bands, respectively, of the mobile stations). These bands A and B are further divided into a plurality of channels with a narrow band of, for example, 25 KHz.

Figure 2:
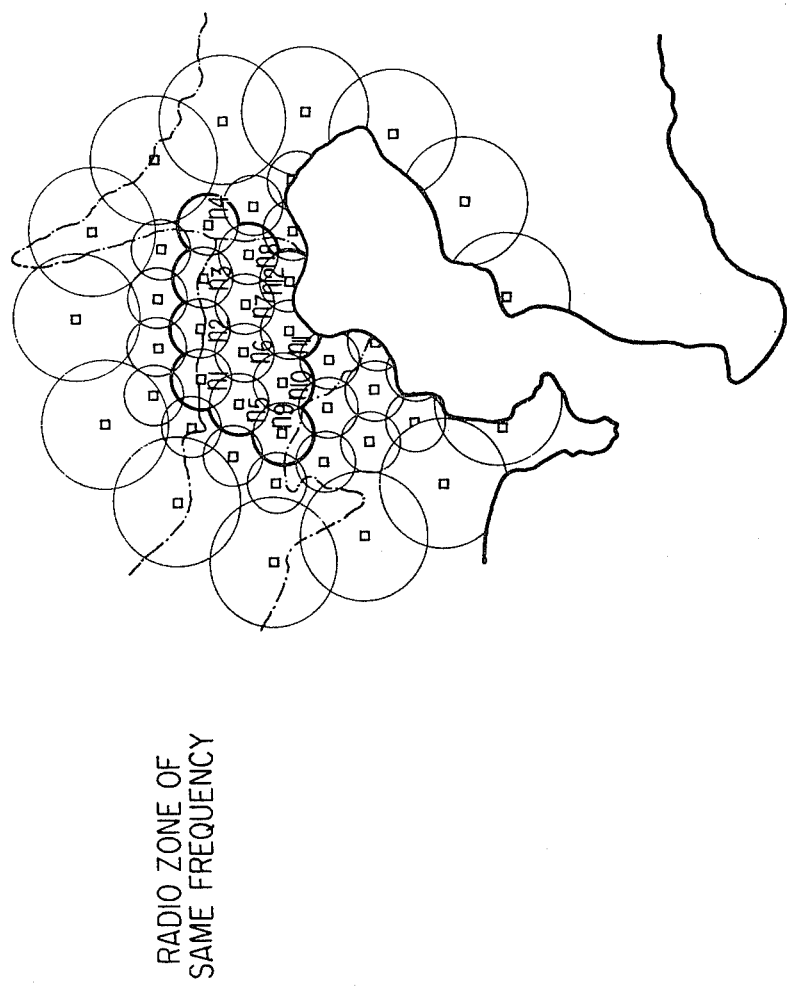
FIG. 2 shows the layout of Kanto area employing a small-cell or a small radio zone system.

FIG. 2 shows the layout of the land mobile radio communication system which is divided into a large number of small cells or radio zones each of which is assigned with a number of channels depending upon its traffic intensity in the Kanto area in Japan. In the fixed radio channel assignment method, the area surrounded by bold lines is a fundamental block consisting of a predetermined number of radio zones each assigned with a predetermined number of different radio channels. The circular radio zones are 5 to 10 km in radius and the base station indicated by a white square is assigned with radio channels $n_1$–$n_{12}$ which are generally 50 to 100 in number. The radio channels assigned to one of the radio zones in the fundamental block may be assigned to a radio zone outside of the fundamental block in such a way that no interference will occur between the two zones. Thus even when the service area is increased, it may be sufficiently covered with the assigned channels (FIG. 1).

Next referring to FIG. 3, the underlying principle of the present invention will be described. A transmitter multiplexing system for a land mobile communication system in accordance with the present invention comprises in general an antenna system 100 with a plurality of input terminals which will not cause any interference as will be described in detail below, a feed line system 200, a transmission multiplexer 320 comprising a junction box 321 with one output terminal and a plurality of input terminals connected to a plurality of bandpass filters 322, and a transmitter group 400 including a plurality of transmitters 401 connected to the input terminals, respectively, of the bandpass filters 322. Only one transmission multiplexer 320 is shown in FIG. 3.

The bandpass filter 322 includes an element such as a cavity resonator having a high frequency selectivity and is tuned to the transmission frequency of the corresponding transmitter 401. The electrical length from the bandpass filter 322 to the junction box 321 and the frequency characteristic of the bandpass filter 322 are so selected that the impedance as seen looking back from the junction point between the bandpass filter 322 and the junction box 321 is matched only to the output of the junction box 321, but is not matched to the remaining bandpass filters 322. Therefore the outputs from the transmitters 401 may be multiplexed by the junction box 321 and radiated through the feed line system 200 and the antenna system 100.

Figure 3:
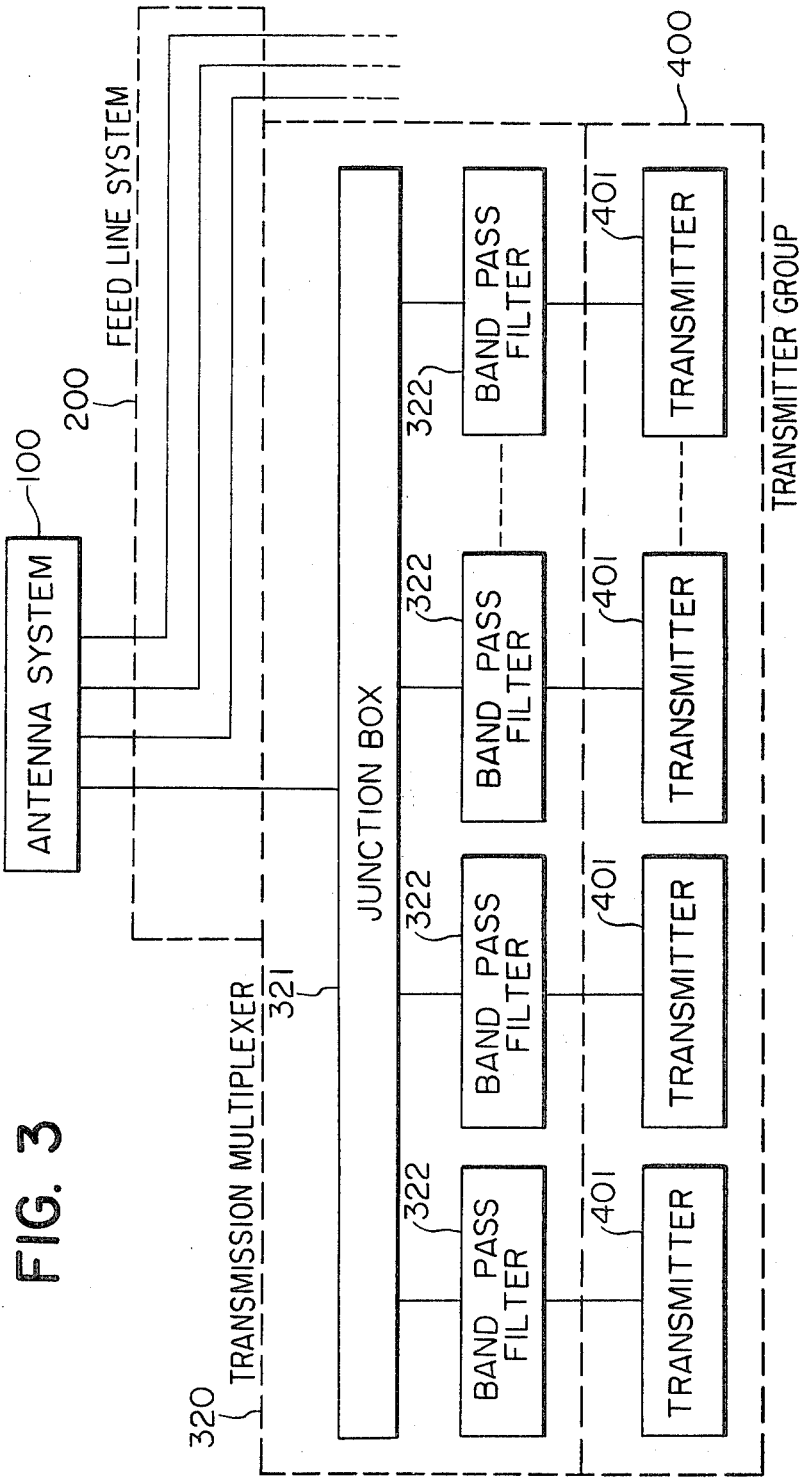
FIG. 3 is a block diagram used for the underlying principle of the transmitter multiplexing system in accordance with the present invention.

In FIG. 3 three other transmission multiplexers and transmitter groups similar in construction and function to those described above are connected through the feed line system 200 to the antenna system 100. The input power from any of the input terminals of the antenna system 100 is radiated only to space, but the power as viewed through the antenna system 100 to the remaining input terminals is not completely coupled. Moreover, the transmission or radiation characteristic of the antenna system 100 as viewed from any input terminals thereof is same so that the outputs from the four transmission multiplexers 320 may be equally radiated.

Figure 4:
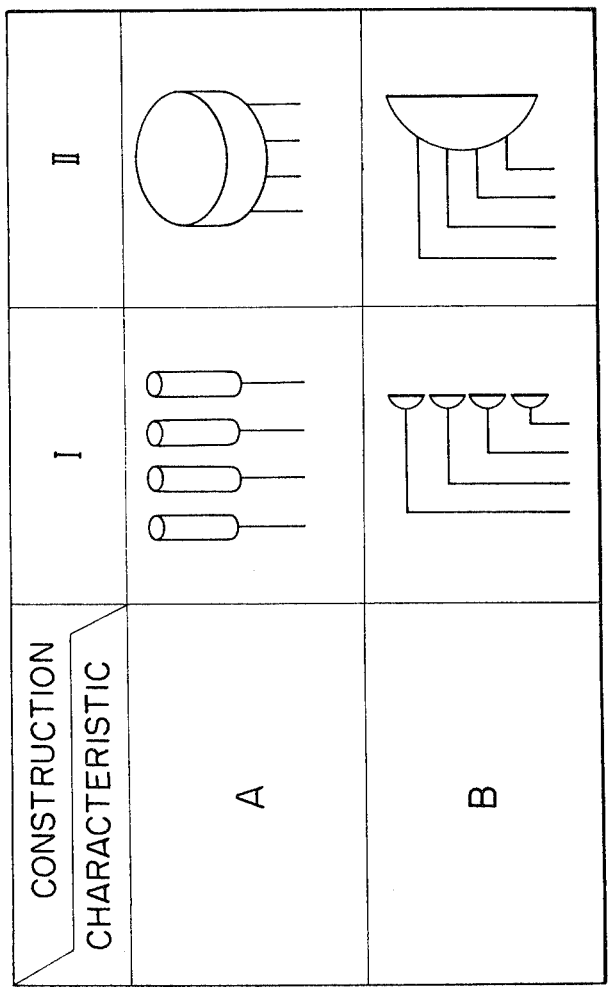
FIG. 4, consisting of A and B, shows various antennas used in the present invention.

FIG. 4 shows the fundamental arrangements of the antenna system 100. The rows A and B show omnidirectional and directional antennas, respectively. The columns I and II show independent and integrated antennas, respectively. The A-I antennas or independent omnidirectional antennas are for example helical antennas, Andrew antennas and so on. B-I antennas or independent directional antennas are for example Yagi antennas, parabolic antennas and so on. A-II antennas or integrated omnidirectional antennas are such that the antenna inputs are fed through a plurality of hybrid couplers to each of multi-reflecting surfaces as will be described in detail hereinafter. B-II antennas or integrated directional antennas are such that primary radiators each with an independent input terminal are arranged in front of one main reflector in such a way that no interference will occur.

In the first embodiment of the present invention, the pass bandwidth $\Delta B_p$ of the bandpass filter makes equal to or greater than the value obtained by dividing the radio frequency band width B for base station transmitting in the mobile radio communication system by the product of the number $n_G$ of the transmission multiplexers 320 connected to one antenna system 100 and the number $n_C$ of the bandpass filters 322 connected to each of the transmitter multiplexers 320, the frequency separation interval $\Delta B_r$ between adjacent bandpass filters in each of the transmission multiplexer 320 being equal to or smaller than the value obtained by dividing the radio frequency band width B by the number $n_C$ of the bandpass filters 322, and the frequency separation interval $\Delta B_a$ between the bandpass filters 322 corresponding to the order of the frequency band of adjacent transmission multiplexers being equal to or smaller than the pass bandwidth $\Delta B_p$ of the bandpass filter 322. Therefore, when a plurality of bandpass filters 322 of a plurality of transmission multiplexers 320 are arranged in the order of their frequencies, any part of the entire mobile radio communication system radio frequency bandwidth B of the base station transmission is covered by the pass bandwidth $\Delta B_p$ of one or more bandpass filters 322.

The above matter is shown by the equations as follows:

$$\Delta B_p \geqq B/(n_G \times n_C) \quad (1)$$

$$\Delta B_r \leqq B/n_C \quad (2)$$

$$\Delta B_a \leqq \Delta B_p \quad (3)$$

Figure 5:
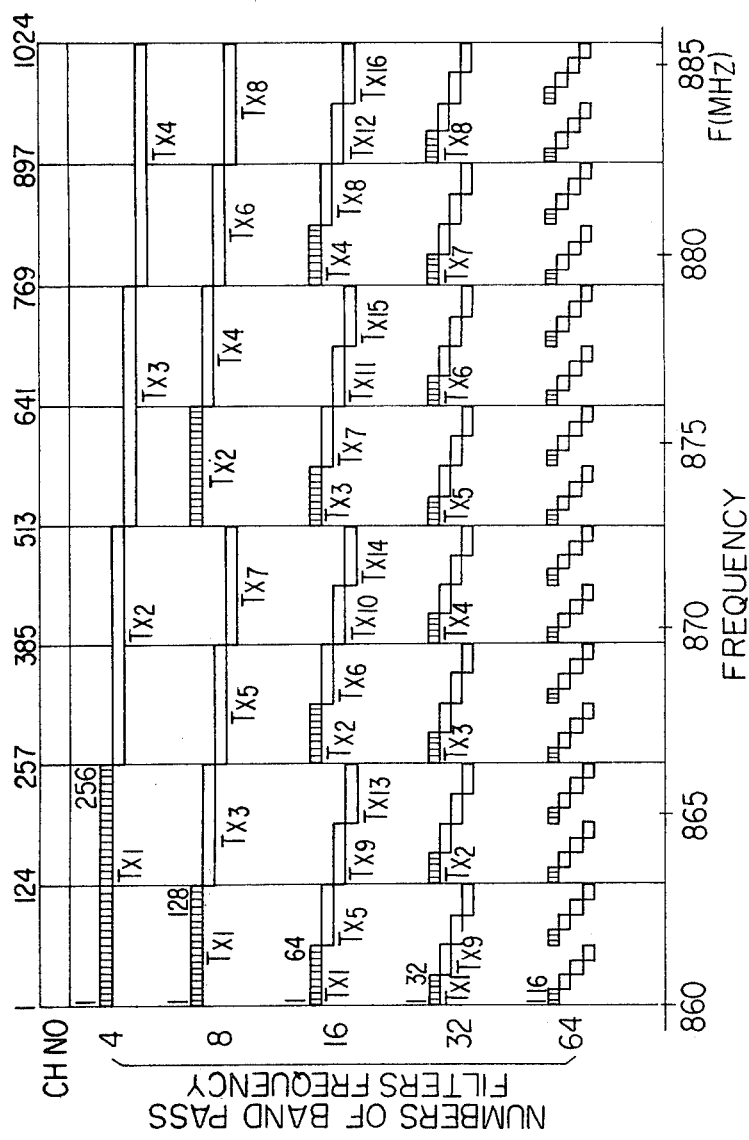
FIG. 5 shows the channel assignments used in the present invention.

FIG. 5 shows these relationships when the land mobile communication system is assigned with the transmission band B of 25.6 MHz in the 800 MHz region, the 25.6 MHz transmission band width B corresponding to 1024 channels each with a bandwidth of 25 KHz. The number of transmission multiplexers 320 connected to the antenna system 100 is four ($n_G=4$); and the number of bandpass filters 322 in each transmission multiplexer 320 is 1, 2, 4, 8 or 16 ($=n_C$).

The channel numbers from 1 to 1024 are indicated in the top row. The rows 4, 8, 16, 32 and 64 show the relationships between the pass bands of the bandpass filters 322 in each transmission multiplexer 320 and the bandwidth thereof with the product of $n_G$ and $n_C$ as a parameter.

As is clear from Eqs. (1), (2) and (3) and from FIG. 5, when the transmission frequency of each of the transmitters 401 connected to each of the corresponding bandpass filters 322 is within the pass band $\Delta B_p$ of the corresponding band pass filter 322, this transmitter 401 may be assigned with any channel. When each of the transmitters 401 may be tuned to any of all 1024 channels, it may instantaneously change the transmission frequency.

From the foregoing discussion, it can be seen that the transmitters 401 higher in number than the product $n_G \times n_C$ (where $n_G$ is the number of the transmission multiplexers 320 and $n_C$ the number of bandpass filters 322 in each multiplexer 320) may use the antenna system 100 in common. That is, the transmitter 401 may be instantaneously switched to any channel in the land mobile communication system bandwidth B of the base station transmission and the transmitters 401 at least equal in number to ($n_G \times n_C$) may use the transmitter multiplexing system in the land mobile communication system.

Next referring to FIGS. 6-10, a preferred embodiment of a transmitter multiplexing system will be described. First referring to FIG. 6, the omnidirectional antenna system 100 has four antenna surfaces 111-114 arranged in such a way that the main horizontally directive beams are angularly spaced apart from each other by 90°. Hybrid couplers 121 and 122 has each two output terminals which are connected to the input terminals of the antenna surfaces 111-114, respectively. The hybrid coupler 121 has two input terminals which are connected to one output terminals, respectively, of hybrid couplers 123 and 124. In like manner, the hybrid coupler 122 has two input terminals which are connected to the other output terminals of the couplers 123 and 124. The hybrid coupler 123 has two input terminals which are connected to first and second transmission multiplexers 300 through the feed line system 200. In like manner, the hybrid coupler 124 has two input terminals connected through the feed line system 200 to third and fourth transmission multiplexers 300.

These hybrid circuits 121-124 are of the conventional type used in the fixed microwave radio communication systems and may be distributed parameter networks including magic T, rat-race circuits, strip lines and so on.

The transmission multiplexer 300 may be similar to that 320 described above. In practice, it includes a transmission and reception multiplexer 310 wherein a first terminal of a three-terminal circulator 311 is connected through the feed line system 200 to one of the input terminals of the hybrid coupler 123. A second terminal of the circulator which corresponds to an output terminal when the first terminal is an input terminal is connected to a reception bandpass filter 312. A third terminal of the circulator 311 which is an input terminal when the first terminal connected to the feed line system 200 is an output terminal is connected to a transmission bandpass filter 313. The output terminal of the transmission multiplexer 320 of the type described in detail elsewhere is connected to the input terminal of the transmission bandpass filter 313. Thus the antenna system 100 may be used both for transmission and reception.

The three-terminal circulator 311 is of the conventional type made of a magnetic material.

The radio signal wave received by any of the antenna surfaces 111-114 of the antenna system 100 is transmitted to a receiver (not shown) in the base station through one of the hybrid couplers 121 and 122, both the hybrid couplers 123 and 124, the feed line system 200, the three-terminal circulator 311 and the reception bandpass filter 312. The output of the transmission multiplexer 320 is transmitted to the antenna surfaces 111-114 through the three-terminal circulator 311, the feed line system 200, either of the hybrid coupler 123 or 124 and both the hybrid couplers 121 and 122.

With one antenna system 100, a plurality of transmission multiplexers and a plurality of multi-channel transmitters, the transmission may be made on any of the channels in the assigned transmission band. However, since only one transmitter 401 is connected to the bandpass filter 322, only one of the channels assigned to this bandpass filter may be used at one time. In another preferred embodiment of the present invention, however, a plurality of multi-channel transmitters are connected to each of the bandpass filters.

Figure 7:
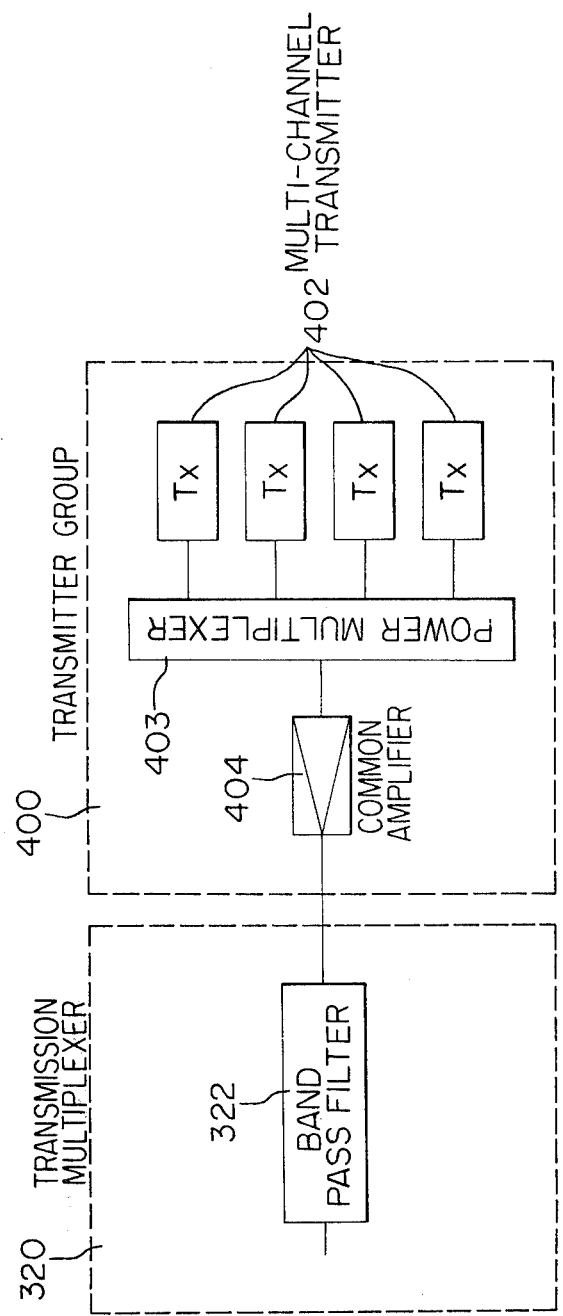
FIGS. 7 and 8 are block diagrams of second and third embodiments, respectively.

Referring to FIG. 7, a plurality of multi-channel transmitters 402 are connected through a power coupler or multiplexer 403 to a common amplifier 404 which in turn is connected to the band pass filter 322 in the transmission multiplexer. The power coupler or multiplexer 403 has a function of multiplexing the outputs from the multi-channel transmitters 402 and the common amplifier 404 amplifiers the weak output from the power coupler or multiplexer 403 so as to compensate for the common loss caused in the power multiplexer or coupler 403 so that the inputs to the common antenna transmission multiplexer 320 from the multi-channel transmitters 402 may be maintained at the same level as when only one transmitter is connected to the multiplexer 320.

The power multiplexer or coupler 403 may be constructed with the hybrid couplers of the type described above and may be made free from the effects of the transmission frequencies of the transmitters 402. The common amplifier 402 may be, for instance, a Class A amplifier which is free from non-linear distortion. Because of the technical reasons, the number of transmitters 402 connected to the common amplifier 404 is limited.

Next a further preferred embodiment of the present invention will be described with reference to FIG. 8. Two high-output multi-channel transmitters 408 are connected to two hybrid couplers 406 and 407, respectively, which in turn are connected to a hybrid coupler 405 which in turn is connected to the bandpass filter 322 in the transmission multiplexer 320. The hybrid couplers 405, 406 and 407 are also connected to high-power dummy loads DL.

The outputs of the multi-channel transmitters 408 are high so that the insertion loss of the power coupler consisting of the hybrid couplers 405, 406 and 407 may be compensated for. For instance, when four transmitters 408 are connected, the compensation for at least four times (6 dB) is required.

Since the transmitters 408 use respective channels at the same time, interference due to the non-linear characteristics of the transmitters 408 will not occur. As a result, a Class C amplifier may be used so that the embodiment shown in FIG. 8 may be more easily realized than that shown in FIG. 7.

Figure 8:
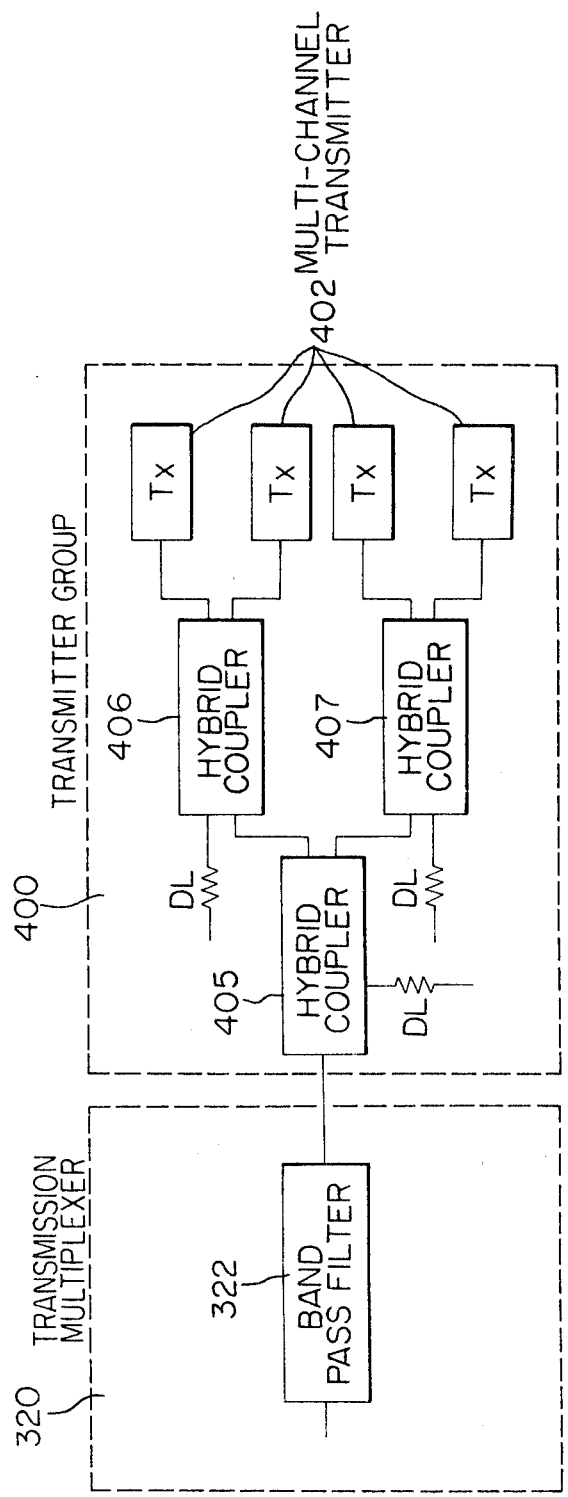

Whereas the common amplifier 404 and the low-output multi-channel transmitters 402 are used in the embodiment shown in FIG. 7, the hybrid couplers 405, 406 and 407 and the high-output multi-channel transmitters 408 are used in the embodiment shown in FIG. 8. Because of the limit of the maximum output due to the non-linear characteristics of the common amplifier 402 in the embodiment shown in FIG. 7 or because of the limit to the maximum output of the high-output multi-channel transmitters 408, the limit of the number of transmitters connected to a transmission system is four. However, since the bandpass filter 322 is incorporated in the transmission multiplexer 320, four of the channels assigned to the band pass filter 322 may be simultaneously used for transmission. This is equivalent to the reduced separation between the adjacent channels used in the same transmitter group 400.

Figure 6:
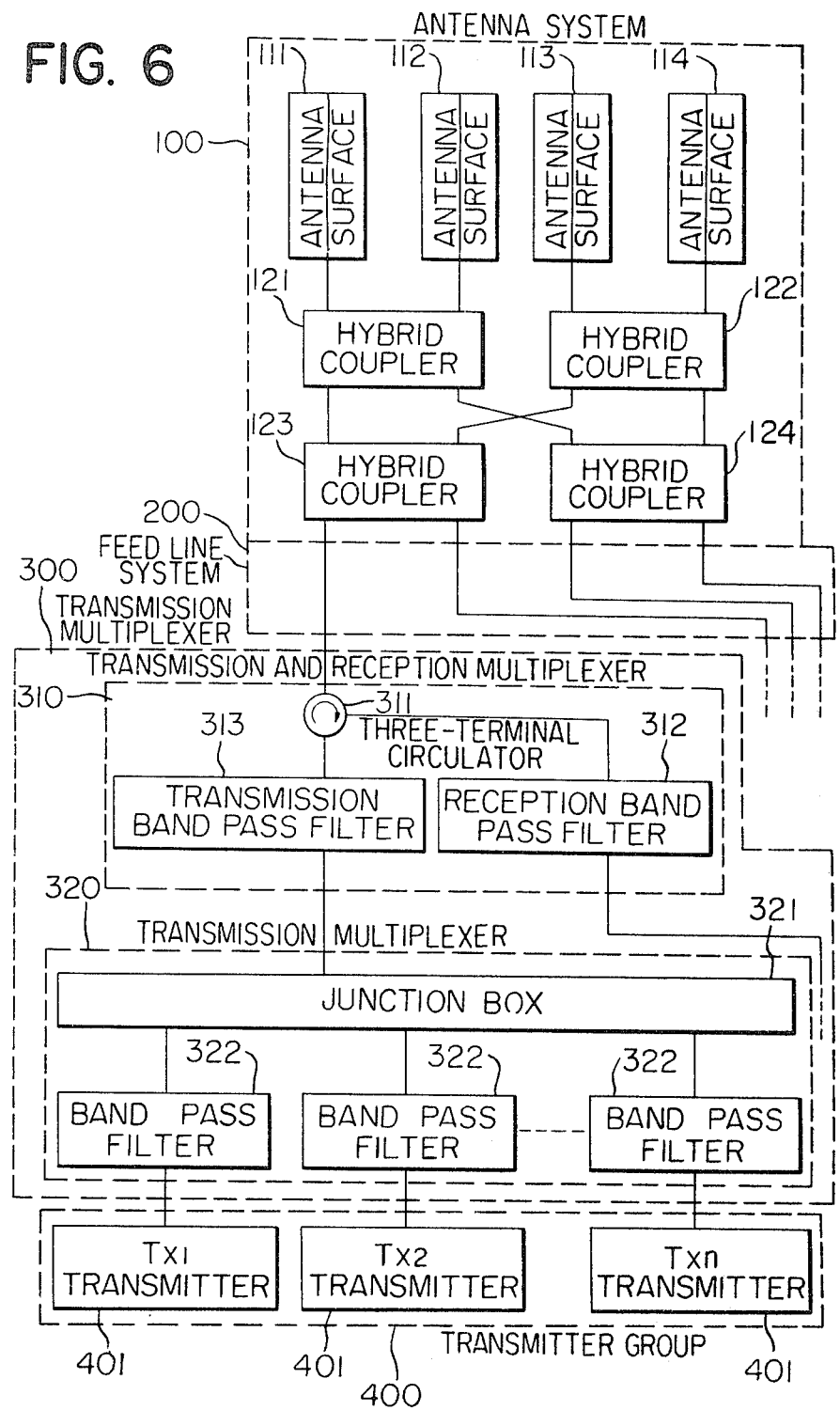
FIG. 6 is a block diagram of a first embodiment of the transmitter multiplexing system in accordance with the present invention.

When the transmitter group 400 as shown in FIG. 7 or 8 is connected to the bandpass filter 322 in the transmission multiplexer 320 of the type shown in FIGS. 3 or 6, $(n_G \times n_C \times n_A)$ (where $n_A$ = the number of transmitters connected to the common amplifier 404 and four in FIGS. 7 and 8) transmitters may simultaneously switch to any channels of the assigned transmission band with the common antenna system 100.

Next assume that in one of any zones or cells shown in FIG. 2 the number of subscribers or mobile units and the traffic intensity are such that it may suffice to connect only one transmitter to each of the bandpass filters as shown in FIGS. 3 or 6. Then with the same number of transmitters, the number of communications at the same time may be further increased through one bandpass filter when a transmitter group to be described below with reference to FIG. 9 is employed.

Figure 9:
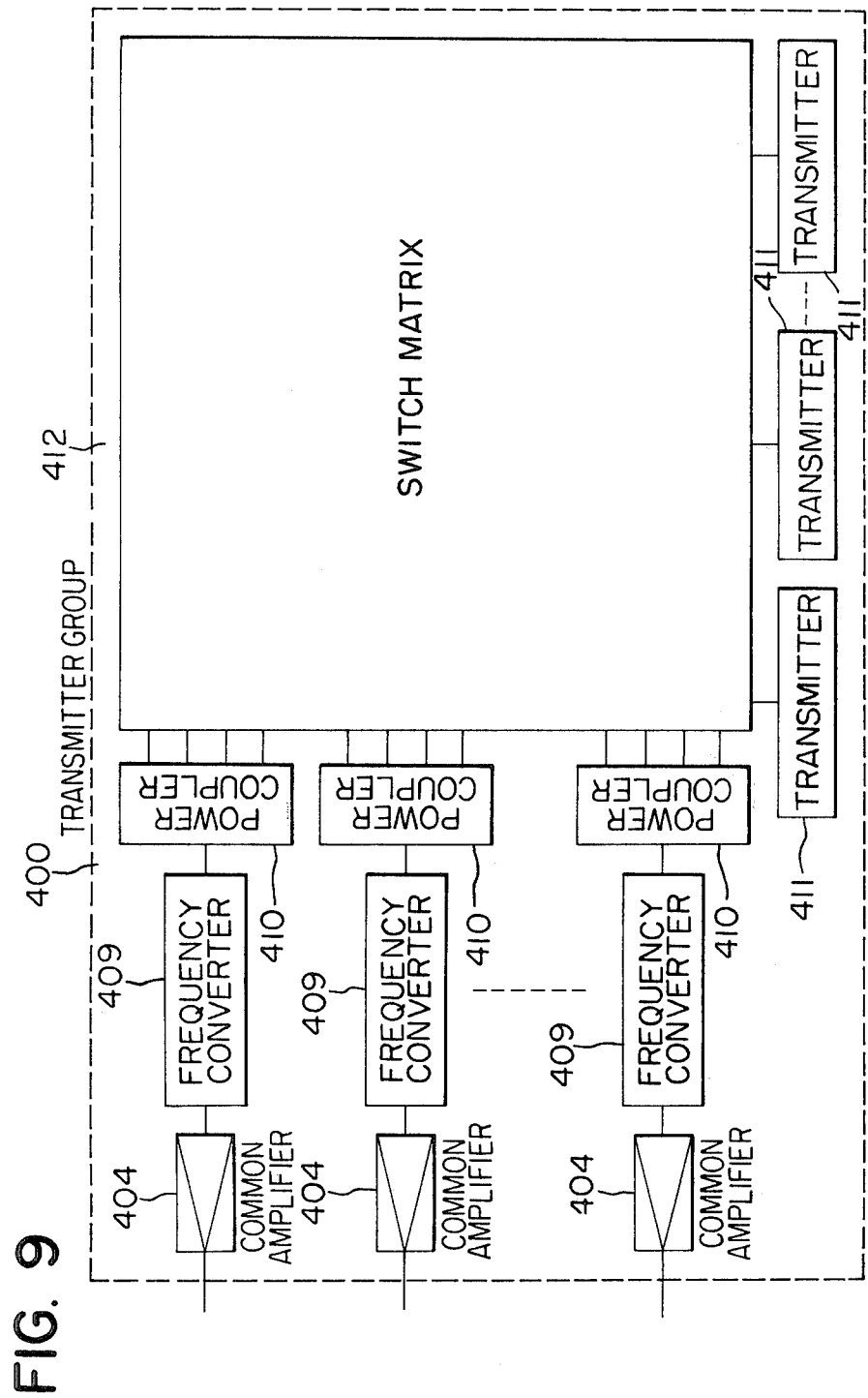
FIG. 9 is a block diagram used for the explanation of a fourth embodiment of the present invention.

Referring to FIG. 9, the transmitter group 400 includes the common amplifiers 404 of the type described elsewhere with reference to FIG. 7. Each of the common amplifiers 404 is connected to a frequency converter 409 which steps up the low-frequency signal to the high-frequency signal the frequency of which is in the transmission band. This frequency converter 409 in turn is connected to a power coupler 410 which couples the weak outputs of the low-frequency signals. A switch matrix 412 is interconnected between a plurality of such power couplers 410 and a plurality of low-frequency, low power multi-channel transmitters 411. Because the transmitters 411 are connected through the frequency converters 409, each transmitter 411 may be tuned to any channels assigned to each bandpass filter 322 in the transmission multiplexer.

Figure 10:
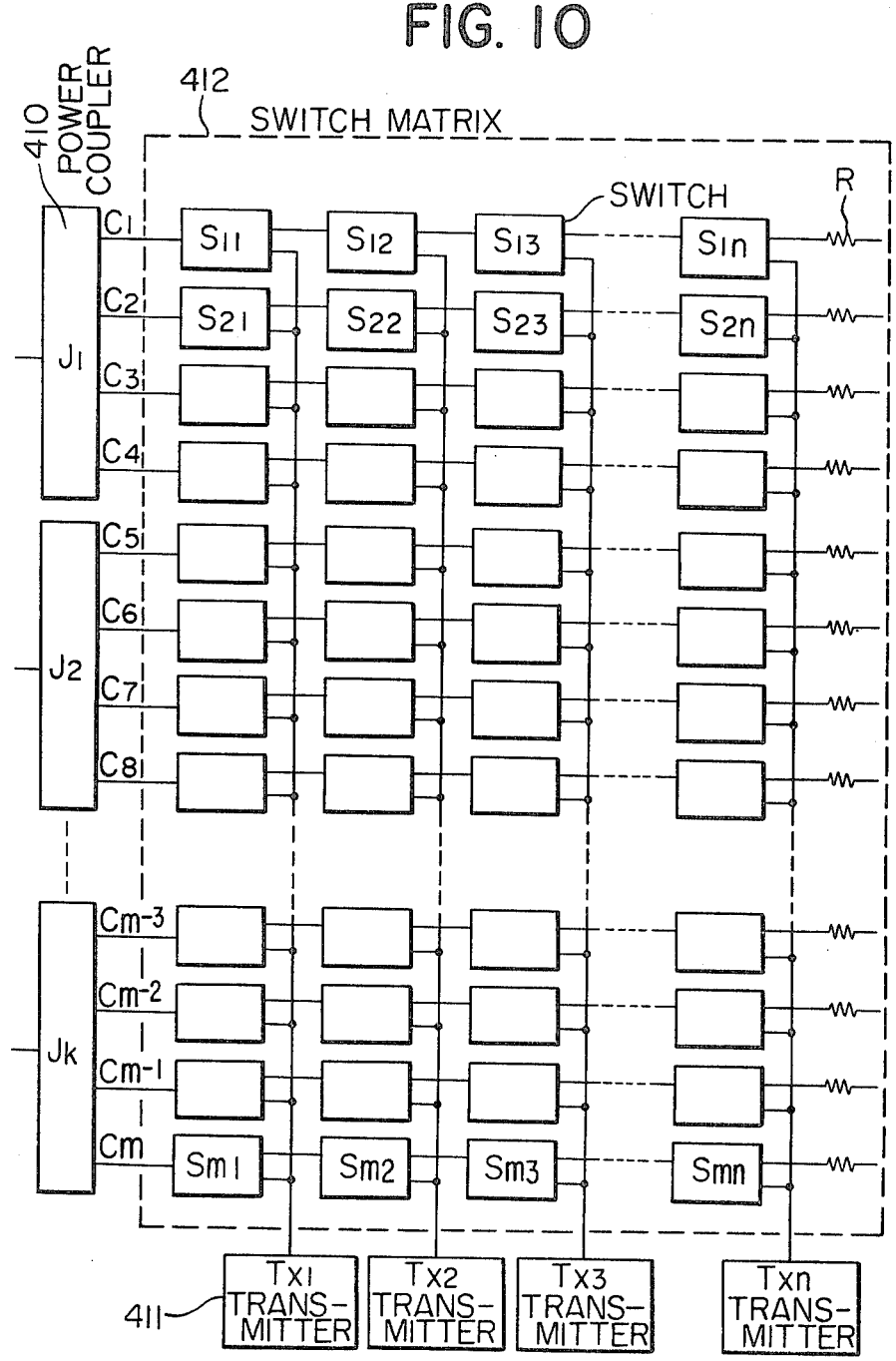
FIG. 10 is a block diagram of a switching matrix thereof.

FIG. 10 shows the construction of the switch matrix 412. In each row, a number of n switches S are connected in series, and a number of m switch rows are arranged. The rightmost switch S in each column is connected to a resistor R, while the leftmost switch is connected to the power coupler 410. The switches in each column are connected in parallel to the transmitter 411.

The fundamental arrangement of this switch matrix 412 remains unchanged whether the low-frequency multi-channel transmitters 411 or the high-frequency multi-channel transmitters are used. However, with the high-frequency multi-channel transmitters, the frequency converters 409 are eliminated; instead of the low-frequency power coupler 410, a high-frequency power coupler must be used; and the switches S are coaxial mechanical contact switches or circulator type switches. The switches S must be interconnected with each other through coaxial cables and the values of the resistors R must be selected accordingly.

With the low-frequency multi-channel transmitters, a conventional cross-bar system or an electronic switching circuit of diode switches may be employed.

Next the mode of operation of the embodiment shown in FIGS. 9 and 10 will be described. In the case of the transmission, one of the transmitters 411 is energized and the switching circuit or matrix 412 is so activated that the energized transmitter 411 may be connected to the unused one of the four input terminals of the power coupler 410 which in turn is connected to the bandpass filter 322 which has the unused channel or channels. Since the power coupler 410 is connected to the bandpass filter 322 through the frequency converter 409 as described elsewhere, the signal the frequency of which is within the frequency band assigned to the bandpass filter 322 is applied to the latter. In the case of the high-frequency transmitter, the frequency converter 409 may be eliminated as described elsewhere. The output from the frequency converter 409 is amplified by the common amplifier 404 and is applied to the bandpass filter 322 in the common antenna transmission multiplexer 320 (See FIGS. 3 or 6).

From the above description, it is now apparent that the transmitters 411 equal in the total number to the transmitters shown in FIGS. 3 or 6 may be selectively connected to more than one bandpass filters.

What is claimed is:

1. A transmitter multiplexing system for a land mobile communication system comprising
   (a) an antenna system with a plurality of input terminals wherein the input signal from one of said input terminals is radiated to space, and is impedance mismatched with respect to the remaining input terminals and wherein the radiation characteristics as viewed from any of said input terminals are all the same;
   (b) a transmitter group comprising a plurality of common antenna transmission multiplexers connected through a feed line system to said input terminals, respectively, of said antenna system, each of said common antenna transmission multiplexers comprising
      a plurality of bandpass filters and a common interconnecting unit connected to said bandpass filters,
      the pass band of each of said bandpass filters being equal to or greater than a value equal to the base station transmission bandwidth of said land mobile communication system divided by the product of
      (i) the number of said common antenna transmission multiplexers and (ii) the number of said bandpass filters in each of said transmission multiplexers, the frequency separation interval between the bandpass filters closest to each other in pass band frequency in each of said common antenna transmission multiplexers being equal to or smaller than a value equal to said transmission bandwidth divided by said number of said bandpass filters in each of said common antenna transmission multiplexers, and the frequency separation interval between the bandpass filters in the adjacent transmission multiplexers being equal to or smaller than the pass band of each of said bandpass filters,
      whereby when all of said bandpass filters are arrayed in the order of their frequencies or pass bands, any point in said transmission bandwidth is within the pass band of at least one bandpass filter; and
   (c) said transmitter group including a plurality of multi-channel transmitters are each capable of operating on any channels assigned to any corresponding bandpass filter in each of said transmission multiplexers.

2. A transmitter multiplexing system as set forth in claim 1 wherein
   said antenna system further comprises a plurality of independent antennas each having the same radiation characteristic and arranged in such a way that no mutual interference as viewed from an input terminal to said independent antenna may occur.

3. A transmitter multiplexing system as set forth in claim 1 wherein
   said antenna system further comprises
   a reflecting surface, and
   a plurality of primary radiators which have the same radiation characteristic and which are so arranged that no mutual interference as viewed from an input terminal to said primary radiator will occur.

4. A transmitter multiplexing system as set forth in claim 1 wherein
   said antenna system further comprises
   four antenna surfaces so arranged that their main horizontal directive beams are angularly spaced apart from each other by 90°, thereby providing a combined omnidirectional antenna synthesized plural pattern, each antenna surface having four input terminals which are connected to two output terminals, respectively, of first and second hybrid couplers,
   said first hybrid coupler having two input terminals one of which is connected to one output terminal of a third hybrid coupler and the other of which is connected to one output terminal of a fourth hybrid coupler,
   said second hybrid coupler having two input terminals which are connected to the other output terminals, respectively, of said third and fourth couplers, and said third and fourth hybrid couplers having two input terminals each, thus four input terminals of said third and fourth hybrid couplers being the input terminals of said antenna system.

5. A transmitter multiplexing system as set forth in claim 1 wherein
   said bandpass filter in each of said transmission multiplexers consists of cavity resonator.

6. A transmitter multiplexing system as set forth in claim 1, further comprising means for connecting each of said plurality of multichannel
   transmitters to the input terminal of a corresponding one of said bandpass filters in each of said common antenna transmission multiplexers,
   each of said multi-channel transmitters being capable of tuning to any of the channels assigned to the corresponding bandpass filter.

7. A transmitter multiplexing system as set forth in claim 1 wherein said plurality of multi-channel transmitters are divided into a plurality of transmitter subgroups equal in number to the bandpass filters in each of said transmission multiplexers, each of said multi-channel transmitters in each subgroup being capable of operating on any channels assigned to a corresponding bandpass filter, and each of said transmitter subgroups being connected to the bandpass filters corresponding to the multi-channel transmitters thereof through a hybrid coupler for combining the outputs from the individual transmitters in said subgroup.

8. A transmitter multiplexing system as set forth in claim 7 wherein a common amplifier in each of said common antenna transmission multiplexers is interconnected between said hybrid coupler and said bandpass filters corresponding to the multi-channel transmitters in each of said subgroups.

9. A transmitter multiplexing system as set forth in claim 1, wherein said transmitter group comprises
a plurality of low-frequency multi-channel transmitters each capable of operating on any channels assigned to all of said bandpass filters in the corresponding transmission multiplexer when the output is frequency-converted, a plurality of power couplers equal in number to said bandpass filters in said corresponding transmission multiplexer,
a switching matrix for connecting the output terminal of the selected transmitter to a selected terminal of a plurality of input terminals of the selected power coupler so that the latter may combine a plurality of output signals at different frequencies at the low-frequency range from the transmitters into one output signal,
a plurality of frequency up converters equal in number to and connected to said power couplers, respectively, for converting the low-frequency signal from the corresponding power coupler into the high-frequency signal, and
a plurality of common amplifiers equal in number to said bandpass filters in said corresponding transmission multiplexer and interconnected between said bandpass filters and said power couplers.

10. A transmitter multiplexing system as set forth in claim 1, wherein said transmitter group comprises
a plurality of high-frequency multi-channel transmitters each capable of operating on any channels assigned to all of said bandpass filters in the corresponding transmission multiplexer,
a plurality of power couplers equal in number to said bandpass filters in said corresponding transmission multiplexer,
a switching matrix for connecting the output of the selected transmitter to a selected input terminal of a plurality of input terminals of the selected power coupler so that a plurality of signals at different frequencies from a plurality of transmitters may be combined into one output signal, and
a plurality of common amplifiers each interconnected between the corresponding power coupler and band pass filter.

* * * * *